Oct. 2, 1934.  R. G. LOCKETT  1,975,234
ELECTRIC MOTOR CONTROLLER
Original Filed Nov. 7, 1928  2 Sheets-Sheet 1

Patented Oct. 2, 1934

1,975,234

UNITED STATES PATENT OFFICE 1,975,234

ELECTRIC MOTOR CONTROLLER

Ralph G. Lockett, Wauwatosa, Wis., assignor to Cutler-Hammer, Inc., Milwaukee, Wis., a corporation of Delaware Original application November 7, 1928, Serial No. 317,709. Divided and this application December 12, 1930, Serial No. 501,842

11 Claims. (Cl. 192—142)

This invention relates to improvements in electric motor controllers, and more particularly to semi-automatic controllers for electric motor driven washing machines and the like.

This application is a division of my Patent No. 1,819,823, dated August 18, 1931.

An object of the invention is to provide extremely simple and efficient control means of the aforementioned character.

Another object is to provide a controller of the aforementioned character including novel means for inching the motor after the initial stop thereof whereby the door or doors of the washer cylinder may be "spotted" or brought into register with the door or doors of the outer casing or tub.

Another object is to provide means, including means providing a dynamic braking effect to facilitate stopping of the controlled motor and the machine being driven thereby.

Another object is to provide means for simultaneously subjecting the motor to the action of the aforementioned means providing a dynamic braking effect and to the action of electromagnetically controlled mechanical braking means for insuring quick stopping thereof under all conditions.

Another object is to provide means subject to initial manual control for effecting automatic control of the starting, accelerating, running, plugging and reversing connections of the controlled motor.

Another object is to provide additional manual control means adapted upon initial stopping of the motor to commutate the circuit connections of the latter for insuring unidirectional operation thereof at a predetermined fixed speed during inching.

Other objects and advantages of the invention will hereinafter appear.

Figure 1:
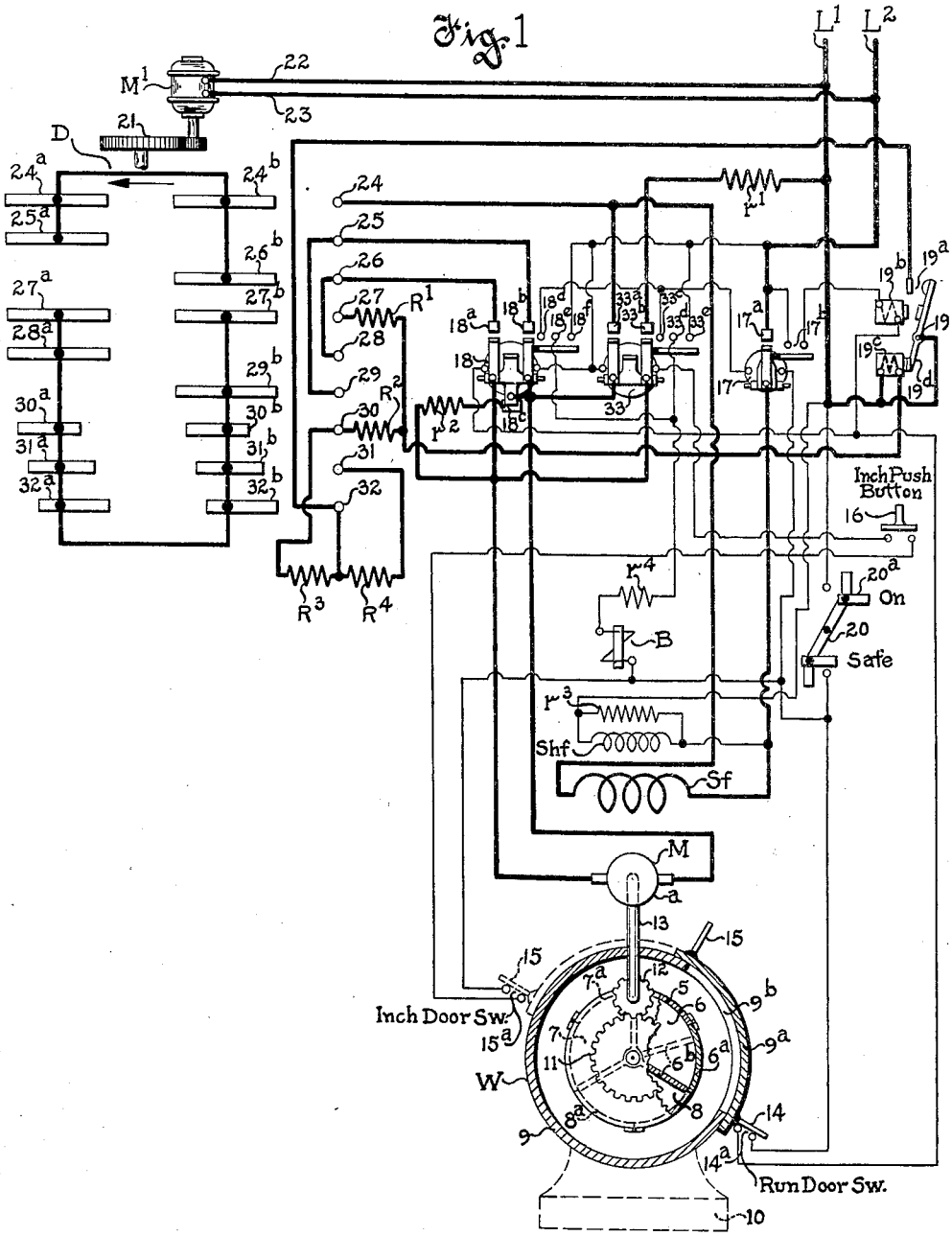
Figure 2:
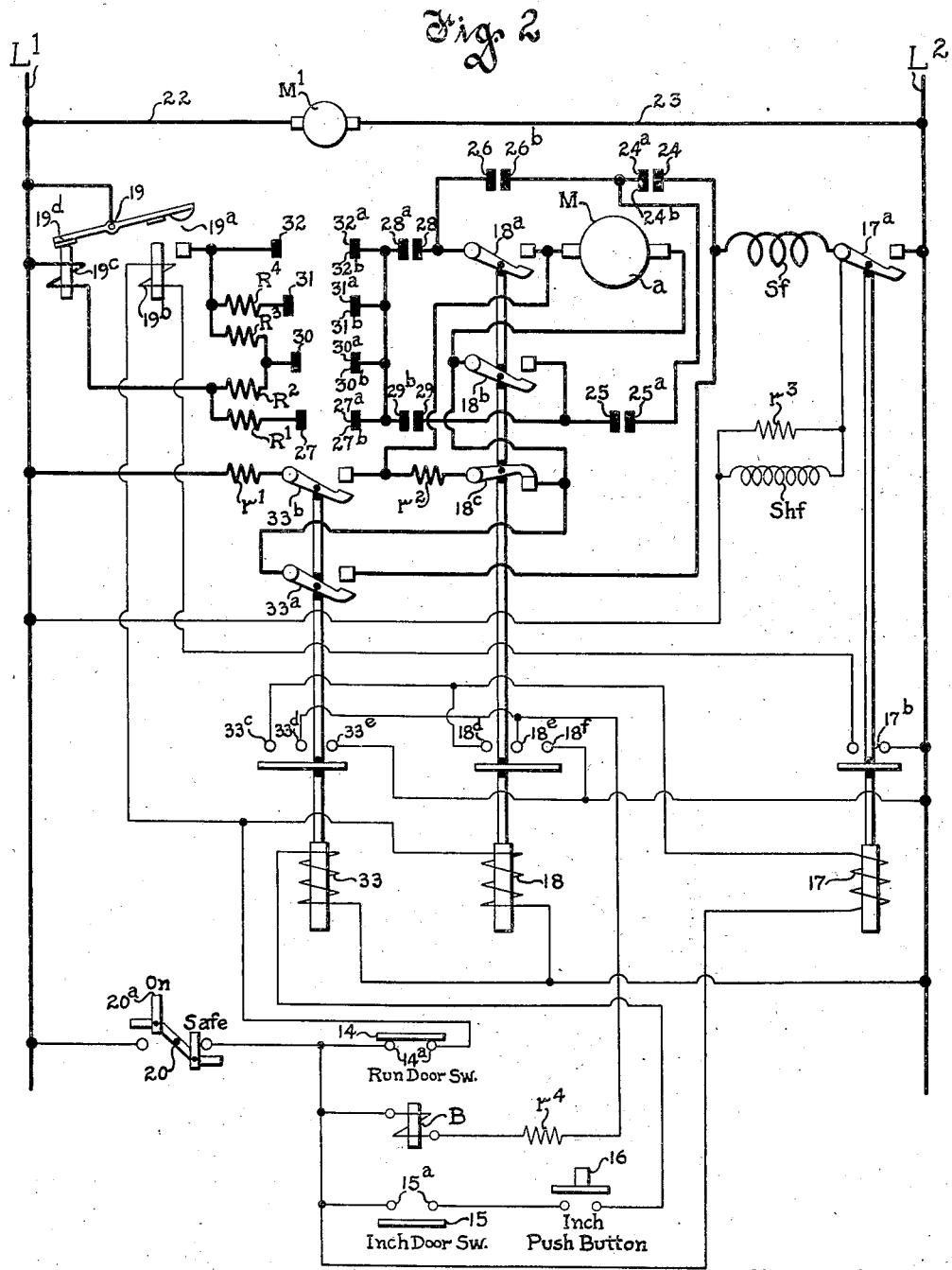

In the drawings, Figure 1 is a schematic and diagrammatic view of a motor driven washing machine and the control means therefor, and Fig. 2 is an across-the-line diagram of the circuits and connections illustrated in Fig. 1.

In the drawings (referring first to Fig. 1) the reference character W designates in general a power operated washing machine of a known type to the control of which the means herein described are particularly adapted. Said washing machine may comprise an inner cylinder or container 5 the interior of which is divided into a plurality of compartments or pockets 6, 7 and 8, as shown; each compartment being provided with a hinged or otherwise movable cover or door $6^a$, $7^a$, and $8^a$, respectively.

Said cylinder is rotatably supported within a stationary tub or casing 9, the latter having a slidable or otherwise movable door or cover $9^a$, which is preferably adapted when in the closed position illustrated to render the casing 9 watertight and adapted when opened (as shown in dotted lines) to provide access to the cylinder 5. The washing machine may be provided with a suitable base or support, as indicated in dotted lines at 10.

The cylinder 5 is connected by means of suitable gearing 11, 12 and shaft 13, with the armature $a$ of a compound wound motor M to be driven by the latter, the series field of said motor being shown at $sf$ and the shunt field thereof being shown at $shf$. It is to be understood, however, that any other suitable type of motor may be employed if desired.

The cover $9^a$ of casing 9 is provided with a contactor 14 which is adapted in the closed position of the door to bridge contacts $14^a$ for initiating the automatic operation of motor M, as hereinafter more fully described; and upon opening of cover $9^a$ the contacts 14, $14^a$ are separated to interrupt such automatic operation.

Also upon full open positioning of cover $9^a$ the contact 15 carried thereby is adapted to bridge contacts $15^a$ to provide for control of motor M through "inch" push button 16. The cooperative relationship of the contacts 14, $14^a$ and 15, $15^a$ with respect to door $9^a$ is merely shown diagrammatically, and any other suitable arrangement may be employed for securing the functions desired.

Motor M is adapted to be supplied with current from a suitable source of supply indicated at lines $L^1$, $L^2$, subject to control by an electromagnetically operable single pole switch 17, an electromagnetically operable double pole switch 18, a lockout switch 19, and a reversing and accelerating drum illustrated diagrammatically at D; assuming closure of the two-position snap switch 20 through depression of "on" push button $20^a$ and assuming closure of contacts 14, $14^a$ through closure of door $9^a$ of casing 9.

Drum D as shown is adapted to be continuously driven unidirectionally by a pilot motor $M^1$ through the medium of suitable gearing 21; said motor $M^1$ being directly connected to lines $L^1$, $L^2$ by conductors 22 and 23. Said drum D comprises a set of stationary contacts 24 to 32, inclusive, and sets of movable contact segments $24^a$, $25^a$, $27^a$, $28^a$, $30^a$, $31^a$, $32^a$ and $24^b$, $26^b$, $27^b$, $29^b$, $30^b$, $31^b$, $32^b$.

Main switch 17 is provided with normally open main contacts 17$^a$, and normally open auxiliary contacts 17$^b$. Switch 18 is provided with normally open main contacts 18$^a$ and 18$^b$, normally closed main contacts 18$^c$, and normally open auxiliary contacts 18$^d$, 18$^e$ and 18$^f$. Switch 19 is of a known form comprising normally open contacts 19$^a$, a shunt operating coil 19$^b$, and a series lockout coil 19$^c$ which acts in the usual manner upon the armature 19$^d$ to initially hold the contacts 19$^a$ in open position.

The aforedescribed elements provide for starting, accelerating, running, plugging and reversing control of the driving motor M, the commutation of resistance sections R$^1$, R$^2$, R$^3$, and R$^4$ being controlled by drum D in the manner hereinafter set forth. Also as will be apparent, upon closure of auxiliary contacts 18$^e$ and 18$^f$ of switch 18 the brake coil B is energized to effect release of the brake.

In order to effect an initial stop of motor M it is only necessary to lift the cover or door 9$^a$ of tub 9 sufficiently far to effect opening of contacts 14$^a$, thereby interrupting the energizing circuit of the winding of switch 18 and the circuit of the coil 19$^b$ of switch 19. Opening of the auxiliary contacts 18$^d$ and 18$^f$ of switch 18 likewise effects interruption of the energizing circuit of the winding of main switch 17, and opening of the aforementioned auxiliary contacts 18$^e$ and 18$^f$ of switch 18 results in deenergization of the winding of brake B to permit the latter to set. Also upon closure of the normally closed main contacts 18$^c$ of switch 18 a closed loop, including the resistance $r^2$, is provided for the armature $a$ of motor M, which causes a dynamic braking effect to assist the brake B in bringing said motor to rest as hereinafter more fully described.

Upon full open positioning of the cover 9$^a$ of tub 9 the contacts 15$^a$ are bridged by contact 15, to provide for energization of the operating winding of a switch 33 upon closure of inching push button switch 16; said switch 33 being provided with normally open main contacts 33$^a$ and 33$^b$ and normally open auxiliary contacts 33$^c$, 33$^d$ and 33$^e$. The contacts 33$^a$ and 33$^b$ are adapted upon closure thereof to connect the motor armature to the line through suitable resistance $r^1$; the resistance $r^2$ being connected in series with said resistance $r^1$ and in shunt to the motor armature due to closure of contacts 18$^c$ of switch 18, as aforedescribed.

Closure of the auxiliary contacts 33$^d$ and 33$^e$ of switch 33 likewise provides for energization of the coil of brake B to release the latter, and closure of auxiliary contacts 33$^c$ and 33$^e$ of switch 33 completes the energizing circuit of the winding of main switch 17 with consequent closure of the main contacts 17$^a$ of the latter. The motor thereupon operates unidirectionally at a predetermined relatively slow speed for inching, so long as the push button switch 16 is held closed.

Inasmuch as the door 9$^a$ of tub 9 is open during the aforementioned inching operation, it is obvious that the operator may readily judge, from the relative rotary position of the cylinder 5, the time at which to release the push button switch 16 in order to bring the motor to a stop with any one of the doors 6$^a$, 7$^a$ or 8$^a$ in the desired registering relation to the opening 9$^b$ in the tub or casing 9.

In Fig. 1 the compartment 6 is shown in proper registration with opening 9$^b$ for unloading of said compartment; that is to say, the lower partition 6$^b$ is in a position to facilitate unloading of the material from said compartment through the opening 9$^b$ upon opening of the compartment door. Each of the other compartments 7 and 8 may thereafter be brought in sequence into unloading position by proper control of motor M through said push button switch 16. When all of the compartments have been unloaded they may be brought in sequence to loading position, as indicated by way of example in dotted lines at 6$^b$.

If during the inching or "spotting" operation one of the compartment doors is allowed to pass beyond its proper registering position for unloading or loading, the operator may proceed to bring the next succeeding compartment door into registry, so that the first mentioned compartment door may be "spotted" when the inching cycle of unloading or loading has been otherwise completed; or the operator may hold the push button switch 16 closed until a substantially complete revolution of the cylinder is effected, to provide for immediate "spotting" of said first mentioned compartment.

While I have shown a washer cylinder having a plurality of radially arranged compartments, it is obvious that the control system herein described is equally applicable to washing machines having single compartment or plural compartment cylinders; and to washing machines of this type wherein it may be desired to stop the cylinder with the respective compartment doors in the same angular position for both unloading and loading.

The shunt field $shf$ is preferably provided with the usual field discharge resistance $r^3$ and a protective resistance $r^4$ is preferably included in circuit in series with the brake coil B.

Operation of the controller will now be described with particular reference to the diagram of Fig. 2. Thus, assuming closure of the switch 20 by depression of the push button 20$^a$, the other parts of the device being in the respective positions illustrated, an energizing circuit is completed for the operating winding of switch 18, said circuit extending from line L$^1$ through said switch 20, contacts 14$^a$, 14 of the "run" door switch, and through said winding 18 to line L$^2$. Energization of said switch 18 effects closure of its main contacts 18$^a$, 18$^b$ and opening of its normally closed main contacts 18$^c$.

Auxiliary contacts 18$^d$, 18$^e$ and 18$^f$ of switch 18 are also closed; closure of contacts 18$^e$ and 18$^f$ effecting energization of the coil B of the brake to release the latter, said circuit extending from line L$^1$ through switch 20, thence through said coil B and protective resistance $r^4$, and through contacts 18$^e$ and 18$^f$ to line L$^2$.

Closure of said contacts 18$^d$ and 18$^f$ effects energization of the operating winding of main switch 17; the energizing circuit thereof extending from line L$^1$ through switch 20, thence through said winding 17 and contacts 18$^d$ and 18$^f$ to line L$^2$. This results in closure of main contacts 17$^a$ and auxiliary contacts 17$^b$ of switch 17.

As aforestated the drum D is rotated unidirectionally at a predetermined relatively slow speed by means of the pilot motor M$^1$, which is shown as connected to lines L$^1$, L$^2$ through conductors 22, 23, respectively. For purposes of description it may be assumed that the drum is first brought into a position to effect engagement of its segments 24$^a$, 25$^a$, 27$^a$ and 28$^a$ with its contacts 24, 25, 27 and 28, respectively. This completes a circuit for the driving motor M for effecting operation of the latter in one direction.

Said circuit may be traced from line $L^1$ through the series lockout coil $19^c$ of switch 19, thence through the step of resistance $R^1$ to contact 27 and segment $27^a$, to segment $28^a$ and contact 28, contacts $18^a$ through the armature of motor M from left to right, contacts $18^b$ to contact 25 and segment $25^a$, to segment $24^a$ and contact 24, and through the series field $sf$ and contacts $17^a$ to line $L^2$. Closure of contacts $17^a$ of main switch 17 likewise completes an energizing circuit for the shunt field $shf$, said circuit being obvious.

Closure of auxiliary contacts $17^b$ of main switch 17 effects completion of an energizing circuit for the shunt operating coil $19^b$ of switch 19, said circuit extending from line $L^1$ through switch 20, contacts $14^a$, 14 of the "run" door switch, through said coil $19^b$ and contacts $17^b$ to line $L^2$. Energization of said coil $19^b$ tends to effect immediate closure of contacts $19^a$ of switch 19, but due to energization of the series coil $19^c$ in the manner aforedescribed said contacts $19^a$ are held in open position pending a decrease to a predetermined value of the current traversing said coil $19^c$ as will now be described.

Upon continued rotation of drum D by pilot motor $M^1$ the segment $30^a$ is brought into engagement with contact 30,—the previously described circuit connections remaining the same. In this manner the resistance section $R^2$ is connected in circuit in parallel with the resistance section $R^1$, with consequent acceleration of motor M. The coils $19^b$ and $19^c$ of switch 19 are preferably so calibrated as to provide for closure of contacts $19^a$ upon a predetermined degree of acceleration of motor M after inclusion of resistance $R^2$ in circuit. As a result of this operation resistance $R^3$ is included in circuit in parallel with each of the resistances $R^1$ and $R^2$.

Continued rotation of drum D results in engagement of segment $31^a$ with contact 31, with resultant inclusion of resistance $R^4$ in circuit in parallel with each of the resistances $R^1$, $R^2$, and $R^3$, to further accelerate motor M; and thereafter upon engagement of segment $32^a$ with contact 32 the coil $19^c$ of switch 19 and all of the resistances $R^1$, $R^2$, $R^3$ and $R^4$ are short-circuited to provide for connection of motor M directly across the line.

After full speed operation of motor M for a predetermined period of time the armature circuit connections are interrupted by simultaneous disengagement of segments $24^a$, $25^a$, $27^a$, $28^a$, and $32^a$ from their cooperating contacts,—the segments $30^a$ and $31^a$ having been previously disengaged from their cooperating contacts, as will be obvious.

Upon continued rotation of drum D segments $24^b$, $26^b$, $27^b$ and $29^b$ are simultaneously brought into engagement with their cooperating contacts 24, 26, 27 and 29, respectively; thereby providing plugging and reversing circuit connections for motor M, which circuit may be traced from line $L^1$ through the series lockout coils $19^c$ of switch 19 and through resistance $R^1$ to contact 27 and segment $27^b$ to segment $29^b$ and contact 29, by contacts $18^b$ of switch 18 through the armature of motor M from right to left, thence through contacts $18^a$ to contact 26 and segment $26^b$, to segment $24^b$ and contact 24, and through the series field $sf$ and contacts $17^a$ to line $L^2$.

As will be apparent from the foregoing description the plugging and reversing connections for motor M are provided solely through the operation of drum D,—the switches 17, 18 and 19 remaining in closed position. Upon engagement of segment $30^b$ with contact 30, due to continued rotation of the drum, resistance sections $R^2$ and $R^3$ will be simultaneously connected in the armature circuit in parallel with each other and in parallel with resistance section $R^1$.

Thereafter the segment $31^b$ is brought into engagement with contact 31 to effect connection of resistance $R^4$ in circuit in parallel with each of the resistances $R^1$, $R^2$ and $R^3$; and continued rotation of drum D effects engagement of segment $32^b$ with contact 32 to again connect motor M directly across the line while operating in such reverse direction.

After a predetermined period of operation of motor M in such reverse direction the drum D acts in the manner aforedescribed to interrupt the circuit and to thereafter again complete the circuit connections for operation of the motor in a forward direction, the plugging and accelerating operations being effected in the manner aforedescribed.

The aforedescribed cycle of starting, accelerating, running, plugging and reversing operations is repeated automatically for the desired washing period, whereas the initial stop of motor M is effected by raising the cover $9^a$ of the casing 9, which causes opening of contacts 14, $14^a$ of the "run" door switch. This interrupts the energizing circuit of the winding of switch 18, with consequent opening of the contacts $18^a$ and $18^b$ of the latter to interrupt the line connections for the motor independently of the drum D.

Switch 18 in opening likewise effects closure of its normally closed contacts $18^c$ thereby connecting the resistance $r^2$ in a closed loop including the motor armature. I have discovered that connection of resistance $r^2$ with the motor armature in a closed loop under the conditions last mentioned acts to provide a dynamic braking effect on the motor induced by the field flux which is maintained at a substantial value for an appreciable time due to the stored up energy represented by such flux in the field structure at the moment when the motor is disconnected from the line. In this connection it is to be observed that the shunt field discharge resistance $r^3$ serves under such conditions to augment or modify the time constant of the gradually disappearing magnetic flux. The dynamic braking effect thus provided tends to bring the motor to rest. At the same time, upon opening of the auxiliary contacts $18^e$ and $18^f$ of switch 18 the energizing circuit of the brake coil B is interrupted, thereby releasing the brake to further assist in stopping the motor.

Similarly, upon opening of the auxiliary contacts $18^d$ and $18^f$ of switch 18 the energizing circuit of the winding of switch 17 is interrupted, with consequent opening of its main contacts $17^a$ and opening of its auxiliary contacts $17^b$. Upon opening of said auxiliary contacts $17^b$ the circuit of shunt coil $19^b$ is interrupted to permit normal open positioning of contacts $19^a$ of switch 19.

The initial stop of motor M is thus rapidly effected without regard to the relative angular position of the compartment doors $6^a$, $7^a$ or $8^a$ with respect to the opening $9^b$ in casing 9 at the time when the cylinder 5 is actually brought to a stop. It may happen that one of the compartment doors is in proper registering relation to the opening $9^b$ as the result of the initial stopping operation, and assuming full open positioning of the casing door $9^a$ the material may be unloaded from that compartment.

In most instances, however, it will be necessary to inch the motor M in order to first bring one of the compartments to proper unloading position. Assuming full open positioning of the casing door $9^a$, the "inch" door switch contacts 15, $15^a$ will be closed, thereby subjecting motor M to energization control by push button switch 16 through the medium of the double pole electromagnetically operable switch 33.

Thus upon closure of push button switch 16 an energizing circuit is completed, which circuit may be traced from line $L^1$ through switch 20 and the contacts $15^a$, 15 of the "inch" door switch, thence through said push button switch 16 and the winding of switch 33 to line $L^2$.

Upon closure of the normally open auxiliary contacts $33^d$ and $33^e$ of switch 33 an energizing circuit is provided for the coil of brake B to effect release of the latter, said circuit extending from line $L^1$ through switch 20, brake coil B and resistance $r^4$, and thence through said contacts $33^d$ and $33^e$ of switch 33 to line $L^2$.

Similarly upon closure of auxiliary contacts $33^c$ and $33^e$ of switch 33 an energizing circuit is provided for the winding of main switch 17, to effect closure of the contacts $17^a$ of the latter; said circuit extending from line $L^1$ through switch 20, thence through said coil 17 and contacts $33^c$, $33^e$ to line $L^2$.

Switches 33 and 17 being thus closed, an energizing circuit is provided for effecting unidirectional operation of motor M at a predetermined constant relatively low speed. Said circuit may be traced from line $L^1$ through resistance $r^1$ and contacts $33^b$ of switch 33, thence through the armature of motor M from left to right, and through contacts $33^a$, series field $sf$ and contacts $17^a$ to line $L^2$. Also due to normally closed positioning of contacts $18^c$ of switch 18 the resistance $r^2$ is included in the circuit in series with resistance $r^1$ and in shunt to the armature of motor M.

The circuit connections just described are maintained pending release of push button switch 16; and inasmuch as the casing door $9^a$ is open and the cylinder 5 is rotating at a relatively slow speed, the operator may readily judge the proper time at which to release the push button 16 in order to bring the first compartment into proper registering relation to opening $9^b$ for unloading. Thus, upon release of push button switch 16 the winding of switch 33 is de-energized and the contacts $33^b$ and $33^a$ of the latter in opening effect disconnection of motor M from the line.

At the same time opening of auxiliary contacts $33^d$ and $33^e$ of switch 33 effects setting of the brake through deenergization of its coil B. Moreover, the aforedescribed closed loop including resistance $r^2$ is provided for the motor armature due to continued closure of the contacts $18^c$ of switch 18, and the motor is quickly brought to rest.

The prime stop or initial "spotting" operation having been effected in the manner just described, the registering door of the particular compartment is opened and the material removed, whereupon the compartment door is again closed (if it is of the hinged or swinging type shown, or if it is of the sliding type it may be latched in open position). The operator then again depresses the push button switch 16 to effect operation of motor M in the manner aforedescribed, said switch being released when the cylinder is in the proper angular position to provide for accurate unloading registration of the next succeeding compartment door when the motor is brought to a stop.

The compartment doors are thus brought to unloading registration with the opening $9^b$ in proper sequence and thereafter the same may be likewise brought in sequence to loading position. When the cylinder compartments have been reloaded, the washing cycle may be again initiated by merely closing the door $9^a$ of the casing 9, such washing cycle having been previously described in detail.

It may be noted that due to the continuous rotation of drum D it might happen that all of the drum contacts are engaged by their respective segments at the time of closing the casing door $9^a$ to initiate the washing cycle. However, due to previous opening of switch 19 the contacts $19^a$ thereof will be maintained in open position for a certain period through the action of lockout coil $19^c$, so that in any event the motor can only be initially subjected to such a value of current as will pass through resistances $R^1$ and $R^2$ when connected in parallel. The motor windings will therefore be adequately protected under all conditions.

As aforeindicated the sequence of operations which are subject to manual control may be varied at will by the operator. Also, as will be apparent to those skilled in this art, the device is susceptible of various other changes in the details of construction and operation thereof.

Thus if desired any suitable timing means may be employed for effecting automatic opening of the door switch contacts 14, $14^a$, or of contacts connected in series with the latter.

As aforestated the pilot motor $M^1$ is continuously operable, and this is desirable, since in practice it is preferred to utilize the pilot motor for driving jointly as many as eight or more of the drums D of corresponding washer control devices.

What I claim as new and desire to secure by Letters Patent is:

1. In a controller for power operated washing machines, in combination, a tub or casing, a cylinder rotatable therewithin, a motor for driving said cylinder, a door on said tub, switch means associated with said door and adapted upon closure of the latter to effect initiation of the washing cycle, said cycle including periodic reversal of operation and acceleration control of the driving motor, means associated with said switch means and adapted upon opening of said tub door to effect substantially immediate stopping of said motor irrespective of the direction or speed of operation thereof, said stopping means including dynamic braking means and electromechanical braking means for said motor, switch means adapted upon full open positioning of said tub door to preset control circuits for said motor whereby the latter may be operated only in one direction and at a predetermined substantially constant speed, and a normally open push button switch adapted upon closure thereof to render said control circuits effective.

2. In a controller for power operated washing machines, in combination, a tub or casing, a cylinder rotatable therewithin, a motor for driving said cylinder, a door on said tub, switch means associated with said door and adapted upon closure of the latter to effect initiation of the washing cycle, said cycle including periodic reversal of operation and acceleration control of the driving motor, means associated with said switch means and adapted upon opening of said tub door to effect substantially immediate stopping of said motor irrespective of the direction or speed of operation thereof, said stopping means including dynamic braking means and electromechanical braking means for said motor, additional switch means associated with said tub door and adapted upon full open positioning of the latter to preset control circuits for said motor whereby the latter may be operated unidirectionally at a constant relatively slow speed for inching, and a normally open push button switch adapted upon closure thereof to render said control circuits effective.

3. In a controller for power operated washing machines, in combination, a tub or casing, a cylinder rotatable therewithin, a motor for driving said cylinder, a door on said tub, switch means associated with said door and adapted upon closure of the latter to effect initiation of the washing cycle, said cycle including periodical reversal of operation and acceleration control of the driving motor, means including electromechanical braking means associated with said switch means and adapted upon opening of said tub door to effect substantially immediate stopping of said motor irrespective of the direction or speed of operation thereof, additional switch means associated with said tub door and adapted upon full open positioning of the latter to preset alternative control circuits for the motor whereby the latter may be operated unidirectionally at a constant relatively slow speed for inching, and a normally open push button switch adapted upon closure thereof to render said control circuits effective.

4. In a controller for motor operated washing machines and the like, the combination with a rotary container, of a driving motor for said container, a tub or casing enclosing said container, movable doors on said container and casing respectively, switch means associated with said casing door and operable upon closure of the latter to effect automatic cyclic control of said driving motor, said control including periodic reversal and step by step acceleration of said motor, an electromagnetically operable brake for said motor and means adapted upon energization of said motor to effect release of said brake, said switch means being also adapted upon partial opening of said casing door to effect interruption of the motor circuit and application of said electromagnetically operable brake, and dynamic braking means controlled by said switch means and cooperating with said electromagnetically operable brake to insure quick stopping of said motor.

5. In a controller for motor operated washing machines and the like, the combination with a rotary container, a driving motor for said container, a tub or casing enclosing said container, movable doors on said container and casing respectively, means operable upon closure of said casing door to effect automatic cyclic control of said driving motor, said control including periodic reversal and step by step acceleration of said motor, an electromagnetically operable brake for said motor and means adapted upon energization of said motor to effect release of said brake, said first mentioned means being also adapted upon partial opening of said casing door to effect interruption of the motor circuit and application of said brake, dynamic braking means controlled by said first mentioned means and cooperating with said electromagnetically operable brake to insure quick stopping of said motor irrespective of the instantaneous speed or direction of operation of the latter, and associated means adapted upon full open positioning of said casing door to preset the control elements for thereafter limiting said motor to unidirectional operation at a relatively slow speed.

6. In a controller for motor operated washing machines and the like, the combination with a rotary container, a driving motor for said container, a tub or casing enclosing said container, movable doors on said container and casing respectively, means operable upon closure of said casing door to effect automatic cyclic control of said driving motor, said control including periodic reversal and step by step acceleration of said motor, an electromagnetically operable brake for said motor and means adapted upon energization of said motor to effect release of said brake, said first mentioned means being also adapted upon partial opening of said casing door to effect interruption of the motor circuit and application of said electromagnetically operable brake, dynamic braking means controlled by said first mentioned means and cooperating with said electromagnetically operable brake to insure quick stopping of said motor irrespective of the instantaneous speed or direction of operation of the latter, associated means adapted upon full open positioning of said casing door to preset the control elements for thereafter limiting said motor to unidirectional operation at a relatively slow speed, and a single normally open push button switch for rendering said last mentioned control elements effective.

7. In a controller for motor operated washing machines and the like, the combination with a rotary cylinder having a plurality of radially arranged compartments, a door in each of said compartments, an enclosing and supporting casing for said cylinder, a door in said casing, a driving motor for said cylinder, circuit connections for said motor, means controlling said circuit connections and providing for automatic starting, accelerating, plugging and reversing of said motor upon closure of said casing door, electromechanical braking means and dynamic braking means for said motor, and means for rendering each of said braking means effective upon interruption of the motor circuit connections through opening of said casing door.

8. In a controller for motor operated washing machines and the like, the combination with a rotary cylinder having a plurality of radially arranged compartments, a door in each of said compartments, an enclosing and supporting casing for said cylinder, a door in said casing, a driving motor for said cylinder, circuit connections for said motor, means controlling said circuit connections and providing for automatic starting, accelerating, plugging and reversing of said motor upon closure of said casing door, electromechanical braking means and dynamic braking means for said motor, means for rendering each of said braking means effective upon interruption of the motor circuit connections through opening of said casing door, a manually operable push button switch, and additional control means rendered effective by said push button switch upon full open positioning of said casing door to thereafter limit said motor to slow speed unidirectional operation, whereby said cylinder may be brought to rest with the compartment doors selectively in register with a part of the enclosing casing.

9. In a controller for a power operated washing machine, the combination with a rotary cylinder having a plurality of radially arranged compartments, a movable door for each of said compartments, an enclosing and supporting casing for said cylinder, a movable door for said casing, an electric driving motor for said cylinder, circuit connections for said motor, means controlling said circuit connections and providing for automatic starting, accelerating and reversing of said motor upon closure of said casing door, said last mentioned means including a plurality of normally open electro-responsive switches and a drum cooperating with the latter, a continuously and unidirectionally operable pilot motor for said drum, electromechanical braking means and rynamic braking means for said driving motor, means for rendering each of said braking means effective simultaneously upon interruption of the motor circuit connections through opening of said casing door, means adapted upon full open positioning of said casing door to render ineffective said drum and certain of said electroresponsive switches, additional electroresponsive control means rendered effective under such conditions to thereafter limit said driving motor to unidirectional relatively slow speed operation for inching, and a single normally open push button switch to control starting and stopping of said motor under the last mentioned conditions, whereby the respective compartment doors may be brought at will into registry with a part of said enclosing casing.

10. In a controller for motor operated washing machines and the like, the combination with a rotary cylinder having a plurality of radially arranged compartments, a door in each of said compartments, an enclosing and supporting casing for said cylinder, a door in said casing, a driving motor for said cylinder, circuit connections for said motor, means controlling said circuit connections and providing for automatic starting, accelerating, plugging and reversing of said motor upon closure of said casing door, electromechanical braking means and dynamic braking means for said motor, means for rendering each of said braking means effective upon interruption of the motor circuit connections through opening of said casing door to provide for substantially immediate stopping of said motor and the cylinder driven thereby, and associated means adapted upon full open positioning of said casing door to present the control means aforementioned for insuring subsequent operation of said motor at a substantially constant slow speed for inching.

11. In a controller for motor operated washing machines and the like, the combination with a rotary cylinder having a plurality of radially arranged compartments, a door in each of said compartments, an enclosing and supporting casing for said cylinder, a door in said casing, a driving motor for said cylinder, circuit connections for said motor, means controlling said circuit connections and providing for automatic starting, accelerating, plugging and reversing of said motor upon closure of said casing door, electromechanical braking means and dynamic braking means for said motor, means for rendering each of said braking means effective upon interruption of the motor circuit connections through opening of said casing door to provide for substantially immediate stopping of said motor and the cylinder driven thereby, associated means adapted upon full open positioning of said casing door to present the control means aforementioned for insuring subsequent operation of said motor at a substantially constant slow speed for inching, and means comprising a single normally open push button switch adapted during closure thereof to render said preset control means effective.

RALPH G. LOCKETT.